Patented July 20, 1926.

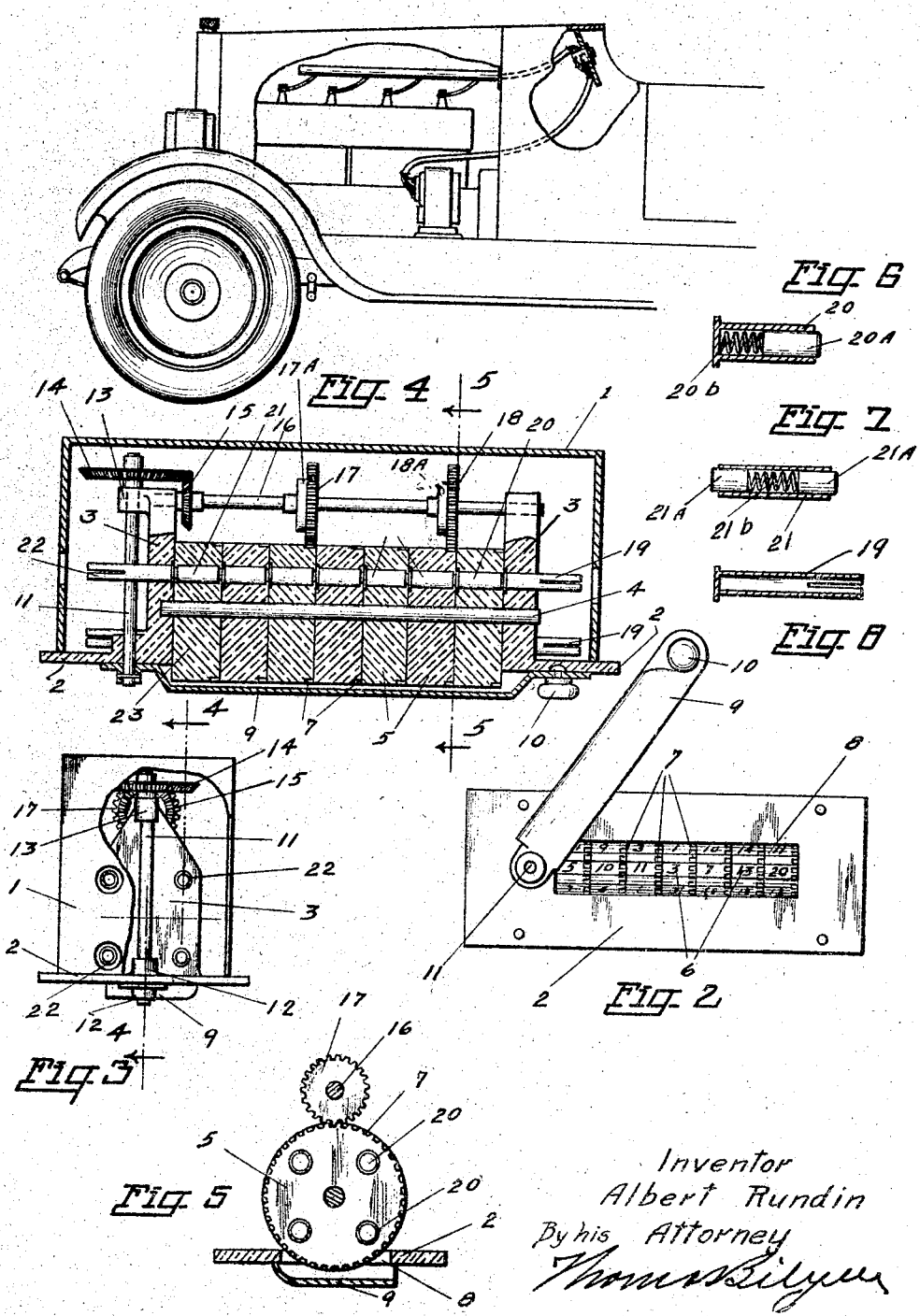

1,593,541

UNITED STATES PATENT OFFICE.

ALBERT RUNDIN, OF PORTLAND, OREGON, ASSIGNOR OF ONE-FOURTH TO CHARLES J. LONGREN AND ONE-FOURTH TO H. HAWKINSON, BOTH OF PORTLAND, OREGON.

ELECTRIC-TRANSMISSION LOCK.

Application filed August 18, 1924. Serial No. 732,788.

My invention relates to a combination locking device to be placed in the electric circuit of the electric transmission used and is so arranged that the circuit may be broken and may only be completed by the turning of the combinations to the position wherein the circuits will be again completed, at which time the current will again flow, thus completing the circuits.

The combinations being known, only, to the operator of the electric transmission system enables the said operator to throw the combination out of unison, thus preventing others to operate the same, and to again complete the combination when desired.

This I accomplish by the mechanism illustrated in the accompanying drawings, in which—

Fig. 1 is a side elevation of the motor vehicle, illustrating my device in position upon the instrument board of the vehicle and showing its connection with the generator and distributor for the same. I have here shown the same in connection with a motor vehicle but I do not wish to be limited to its use upon motor vehicles but rather to a broader application for use in connection with electric transmissions generally.

Fig. 2 is a plan view of the assembled lock shown with the cover partially removed to show the combination segments in position.

Fig. 3 is an end view of the same with the end closure partially removed to better illustrate the inner assembly arrangement.

Fig. 4 is a sectional plan view of the same, taken on line 4—4 of Fig. 3 looking in the direction indicated.

Fig. 5 is a partial sectional end view assembly taken on line 5—5 of Fig. 4 looking in the direction indicated.

Fig. 6 is one member of the segments placed in the segment wheel and through which the electric current flows, the same being shown partially in section.

Fig. 7 is a partial cross section of one of the segments placed next to the outer end of the assembly, that passes through the segment wheel.

Fig. 8 is a sectional view of one of the end terminals for making the electrical conductor fast to the electrical transmission lock.

Like reference characters refer to like parts throughout the several views.

1 is the case like container for the lock to which the end member 2 is attached and which is turned in an upright position as shown at 3 to afford a rigid and suitable bearing for the shaft member 4 which acts as an axis of rotation for the segment wheels mounted thereupon. These segment wheels have graduations about their outer periphery as shown at 6 to serve as position indicators to the operator of the same. These segment wheels may have roughened edges as shown at 7 to enable the ease of rotation by the operator of the same. The case has a slot, or opening 8 along its side through which a part of the periphery of the segment wheels show and project for ease of reading and manipulation. A closure plate 9 serves to close the same which has a suitable knob 10 for the opening and closing of the same. The closure plate 9 is secured to shaft 11 and when the closure is opened by rotation about the pivotal center 11, the same rotates the shaft 11 because of being held in fixed relation therewith. The object in attaching the closure to the shaft 11 is because of the necessity of throwing the combination out of adjustment when leaving the work by the operator, or driver of the vehicle. Suitable bearings for the shaft 11 are provided to maintain the same in alignment as shown at 12 and 13 and a bevel gear 14 is mounted thereupon which coacts with the gear 15 mounted upon shaft 16. Shaft 16 runs approximately parallel with shaft 4 and has mounted upon it clutch pinions 17 and 18 having the clutch members 17$^a$ and 18$^a$ attached thereto. The gears 17 and 18 coact with gearing mounted upon the segment wheels and when the gears 17 and 18 are driven clock wise through the action of the clutch members 17$^a$ and 18$^a$ the segment wheels are also turned, but when the shaft 16 is turned contra-clockwise the clutch acts and the gears are not turned and, therefore the segment wheels are left in the position, and therefore, out of position to complete the electric circuit.

If my locking device is to be used on the electric transmission system of two or more circuits, the number of circuits through the transmision wheel segments will be the same as the number of circuits, which may correspond to the number of cylinders, if used in conjunction with the same. I have illustrated in my drawings four circuits to be completed, and will now describe the action of the completed circuit as shown in the sectional view of Fig. 4. A suitable end terminal 19 is placed within the nonconducting frame member 3 in position to contact with the segment member 20. To afford a compression contact being made between these electric circuit units I have made these segments as shown in Fig. 6 wherein 20ª is held within the barrel like member 20 and is held under compression by the action of the spring 20ᵇ. Each of the segment wheels excepting the one upon the opposite end of the series carry segments similar to that illustrated but segment wheel 23 carries a segment member as illustrated in Fig. 7 wherein the barrel like member 21 carries two contacting points 21ª that are held under compression by the action of the spring 21ᵇ. The circuit is completed by passing into the end terminal 22 from which it is connected into the remainder of the electric circuit. It will be seen that the movement of any of the segment wheels will break the circuit and the same can only be completed by again turning the segment wheels into the position to complete the circuit as indicated in the sectional view of Fig. 4.

Having thus described my invention I wish to make the following claims, therefor—

1. An electric transmission lock comprising a case structure, a top for said case having vertical ends adapted to supporting a central shaft and to maintaining electrical terminal ends therein and having a transverse opening, graduated segment wheels having gear teeth around one side of their periphery mounted upon the central shaft, a closure adapted to close the transverse opening and adapted to rotate the segment wheels when manipulated, electric segments disposed within the segment wheels and adapted to placement to form electrical circuits across said wheels, means within the electrical segments to create tight contacts when made and means for making and breaking the electrical circuits.

2. An electrical transmission lock comprising a case like structure, a top member for said case having a transverse opening and vertical end sections adapted to maintain a central shaft and electrical terminals in insulated placement, graduated segments disposed to extend partially within the transverse opening and adapted to having an electrical circuit completed thereacross, a closure for said transverse opening adapted, upon manipulation, to rotate one or more of said segment wheels, electrical conduit segments disposed across each segment wheel adapted to creating end pressure between the electrical segments when contacting, and means for making and breaking the electrical circuit.

ALBERT RUNDIN.